Nov. 10, 1959    H. C. A. VAN DUUREN    2,912,499
INTELLIGENCE TRANSMITTING APPARATUS
Filed Nov. 15, 1954    9 Sheets-Sheet 1

FIG. 1

INVENTOR.
Hendrik Cornelis Anthony van Duuren
BY
Brown, Jackson, Boettcher & Dienner
Att'ys.

INVENTOR.
Hendrik Cornelis Anthony van Duuren
BY
Brown, Jackson, Boettcher & Dienner
Attys.

| CODE-CONVERSION | | | |
|---|---|---|---|
| FIGURES | LETTERS | MINIMUM CODE<br>a b c d e | GROUP CODE<br>p a b c d e |
| 5 | T | ○ ○ ○ ○ ● | ● ○ ○ ○ ○ ● |
| + | Z | ● ○ ○ ○ ● | ○ ● ○ ○ ○ ● |
| 2 | W | ● ● ○ ○ ● | ○ ● ● ○ ○ ● |
| ) | L | ○ ● ○ ○ ● | ○ ○ ● ○ ○ ● |
| £ | H | ○ ○ ● ○ ● | ○ ○ ○ ● ○ ● |
| 6 | IJ | ● ○ ● ○ ● | ○ ● ○ ● ○ ● |
| 1 | Q | ● ● ● ○ ● | ● ○ ○ ● ○ ● |
| 0 | P | ○ ● ● ○ ● | ○ ○ ● ● ○ ● |
| . | M | ○ ○ ● ● ● | ○ ○ ○ ● ● ● |
| / | X | ● ○ ● ● ● | ● ● ○ ○ ● ● |
|   | LETTERS | ● ● ● ● ● | ● ○ ● ○ ● ● |
| = | V | ○ ● ● ● ● | ● ○ ● ● ○ ○ |
| 9 | O | ○ ○ ○ ● ● | ○ ○ ○ ○ ● ● |
| ? | B | ● ○ ○ ● ● | ○ ● ○ ○ ● ● |
|   | FIGURES | ● ● ○ ● ● | ● ● ○ ○ ● ○ |
| @ | G | ○ ● ○ ● ● | ○ ○ ● ○ ● ● |
| UNP.TAPE | | ○ ○ ○ ○ ○ | ● ○ ○ ○ ● ● |
| 3 | E | ● ○ ○ ○ ○ | ● ● ○ ○ ○ ○ |
| - | A | ● ● ○ ○ ○ | ○ ● ● ○ ○ ○ |
| LINE FEED | | ○ ● ○ ○ ○ | ● ○ ● ○ ○ ○ |
| SPACE | | ○ ○ ● ○ ○ | ● ○ ○ ● ○ ○ |
| , | S | ● ○ ● ○ ○ | ○ ● ○ ● ○ ○ |
| 7 | U | ● ● ● ○ ○ | ○ ● ● ● ○ ○ |
| 8 | I | ○ ● ● ○ ○ | ○ ○ ● ● ○ ○ |
| ; | N | ○ ○ ● ● ○ | ○ ○ ○ ● ● ○ |
| % | F | ● ○ ● ● ○ | ○ ● ○ ● ● ○ |
| ( | K | ● ● ● ● ○ | ● ○ ● ● ○ ○ |
| : | C | ○ ● ● ● ○ | ○ ○ ● ● ● ○ |
| CARR.RET | | ○ ○ ○ ● ○ | ● ○ ○ ○ ● ○ |
|   | D | ● ○ ○ ● ○ | ○ ● ○ ○ ● ○ |
| BELL | J | ● ● ○ ● ○ | ○ ● ● ○ ● ○ |
| 4 | R | ○ ● ○ ● ○ | ○ ○ ● ○ ● ○ |
|   | SIGNAL | | ● ● ● ○ ○ ○ |
|   | IDLE TIME β | | ● ○ ○ ● ● ○ |
|   | IDLE TIME α | | ● ● ○ ● ○ ○ |

H. C. A. VAN DUUREN 2,912,499

INTELLIGENCE TRANSMITTING APPARATUS

Filed Nov. 15, 1954

INVENTOR.

Hendrik Cornelis Anthony vanDuuren

BY

Attys.

FIG.8

Nov. 10, 1959    H. C. A. VAN DUUREN    2,912,499
INTELLIGENCE TRANSMITTING APPARATUS
Filed Nov. 15, 1954    9 Sheets-Sheet 8

INVENTOR.
Hendrik Cornelis Anthony van Duuren
BY
Brown, Jackson, Boettcher & Dienner
Att'ys.

INVENTOR.
Hendrik Cornelis Anthony vanDuuren

United States Patent Office 2,912,499
Patented Nov. 10, 1959

2,912,499

INTELLIGENCE TRANSMITTING APPARATUS

Hendrik Cornelis Anthony van Duuren, Wassenaar, Netherlands, assignor to Staatsbedrijf der Posterijen, Telegrafie en Telefonie, The Hague, Netherlands Application November 15, 1954, Serial No. 468,973

Claims priority, application Great Britain November 16, 1953

19 Claims. (Cl. 178—23)

The invention refers to apparatus for transmitting intelligence coded in an $n$-element minimum code comprising the steps of converting the intelligence from said minimum code into a group code, said group code having a morphological analogy with the minimum code, this morphological analogy enabling the conversion of more than ¾ of the signals from the minimum code into the group code by the addition of one element in a fixed position, all the $n+1$ elements in the resulting group code carrying a portion of the information contained in the transmitted intelligence.

The invention further resides in apparatus of this kind adapted for provisionally storing the $n$ minimum code elements on $n$ triggers, means for deriving the polarity of the additional element from said $n$ triggers and means for supplying a pulse to change the position of the $n$ triggers to the position which they shall occupy in the $n+1$ element group code.

The invention also contemplates in apparatus of this kind converting the minimum code signals, the elements of which do not occur talis qualis in the corresponding group code signal, by changing the polarity of some of the elements in such manner, that in the resulting group code the signals shall only contain $r$ elements of given polarity for some signals and $r+1$ elements of given polarity for other signals, so that two distinct groups may be formed, into which the signals will fall, and which may be distinguished by a parity element, to be transmitted after each signal, this element being on reception used—by comparison with a locally derived element—for medium condition information.

The invention also covers the group codes obtained from the minimum or central code.

In general it relates to a telegraph system utilizing for transmission, in particular over radio circuits, a code taken from a code group comprising an equal length element minimum code as a core and a multitude of equal length element codes, adapted to special requirements such as polarity distortion discrimination, grouped around this central code.

Between the central code and any of these derived codes exist morphological relations enabling the conversion of one into the other by means of apparatus requiring only a minimum number of elements. It is these relations which characterise the group of this invention, which also covers telegraph systems incorporating the said apparatus for converting each derived code into the central basis code and conversely.

If all codes are contemplated on a synchronous system basis, and thus are considered stripped of any redundant separate elements expressly and exclusively provided for synchronising purposes, the five equal length element code will be found to be a minimum code in that it comprises 32 variations, which suffice for the transmission of the alphabet and for the provision of additional operational signals serving to control the action of a printing mechanism. The information transmittable by such a code will be called its intelligence content.

In addition to the intelligence elements the five unit code usually is completed by separate start and stop elements, enabling simpler receivers to be used and also serving the object of transmission speed distortion correction, a stop element of greater length being often used to this purpose.

Transmission of only the intelligence content would require more complicated receiving mechanism, able to synchronize itself to the intelligence elements and also able to recognize the element polarity with certainty in the face of speed variations.

Even the most perfect receiver in this sense will not be able to combat certain polarity distorting properties of transmitting media and it is therefore realised according to the invention that it is preferable to complicate the receiver in another direction than towards minimum margin sensitivity, namely, to enable it to recognize such polarity distortion by adjusting it to handle one of the other group codes. It is thus realised that the completion of the intelligence elements of the minimum code by start-stop elements in known manner does not ultimately lead to the object of reception with discrimination against polarity distortions and another code from the family than that obtained by completing the five intelligence elements by the addition of start and stop elements is therefore used, viz. a code in which any elements additional to the minimum themselves contain a portion of the intelligence originally contained in the five minimum code elements.

Codes suitable in the sense of the preceding paragraph may be generated from the minimum 5 element code by adding to these 5 elements, in the present example by preceding the 5 elements by an extra element. The series so obtained is fed to parity determining circuits both in the transmitter and the receiver and the output from these circuits determines a polarity distortion discrimination element, which, in the absence of such distortion, should be the same in both terminal stations. If they should differ polarity distortion correcting means come into operation.

It is in the interests of the simplicity of the apparatus requisite to the generation of the group code, as well as that necessary to reform the minimum code from the group code, that in all but a few exceptional cases of signals the minimum code elements occur as such in the group code.

It is an object of the invention to provide means for generating a group code from a minimum code.

It is another object to provide means for identifying the few cases of signals mentioned above and for providing subsidiary transformation for minimum code elements in these cases, as required to bring them into the same supplementation scheme as the main body of the minimum code signals.

In an embodiment the transformation means as mentioned above comprise a number of cell relays.

An additional feature of this embodiment is that in most cases only 2 and in a single case only three elements are involved in all transformations.

It is another object of the invention to provide means to reform the minimum code from the group code. In an embodiment of this apparatus the reconversion exceptional circuits are designed on analogous lines as those for generating the group code from the minimum code.

The group code envisaged in the above has a group feature enabling the particular receiver characteristics to decide whether polarity distortion has occurred. Such feature may for instance consist in the fact, that all code signals shall conform to a certain law regarding the grouping of mark elements and of space elements. This law may be of various kinds but a single simple example only will be given.

The invention will be explained in detail, reference being had to the following figures.

Figure 1:
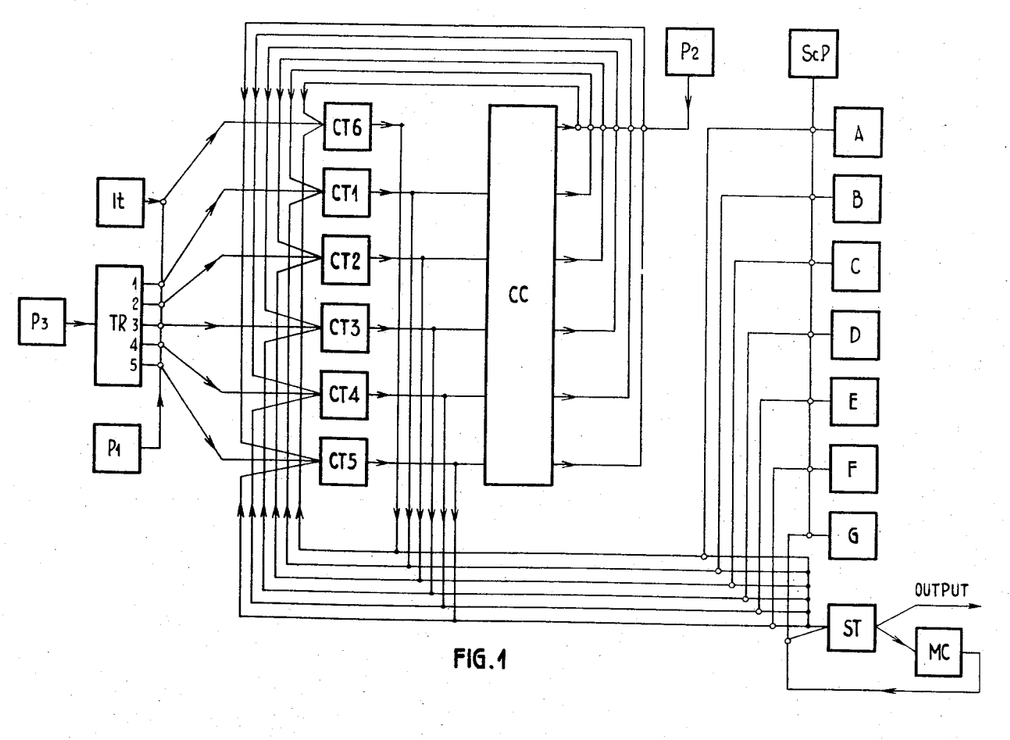
Fig. 1 gives a block diagram of the transmitter.

Fig. 1 gives in the form of a block diagram a general view of the construction of the transmitter and its working as regards the conversion of the signals from the five units code into signals in a six units code which completely contain the intelligence of the original signals and the way in which, when transmitted, the signals of this code are provided with an additional element as a seventh element on the transmission path.

In this figure TR is a tape reader, which is commanded by an impulse generator P3. It is a trigger capable of issuing idle time signals. CT1 to CT6 are the so-called code triggers. The triggers have two stable states of equilibrium.

As taught hereinafter, a negative pulse from impulse generator P1 is first coupled to the input terminal of code trigger CT6, so that a negative, or minus (—), polarity is present initially at the output terminal of CT6. If desired such pulse may also be applied to code triggers CT1—CT5 at the same time.

The five elements of which consists each signal are scanned in the tape reader and simultaneously transferred, under the command of the signal coupling means or impulse generator P1, from the tape reader (TR) to the signal input terminals of the signal responsive means or code triggers CT1 to CT5 at the moment when P1 issues an impulse.

As long as trigger It issues idle-time signals the connections between the tape reader (TR) and the triggers CT1 to CT5 are blocked.

The output terminals of the code triggers CT1 to CT6 are connected to a code converter (CC), in which a number of diode rectifier circuits are taken up.

The respective output terminals of the code converter (CC) are connected to the respective input terminals of the code triggers CT1 to CT6.

Under the control of the impulse generator P2 voltages are applied via the output terminals of this code convertor to the respective input terminals of the code triggers, as a result of which at the output terminals of these triggers there appear the first six elements of the code to be transmitted.

The signal eventually transmitted will consist of seven signal elements.

In order that at the receiving end a signal can be recognized as "faulty" or "correct," each signal is given the same mark/space ratio.

Figure 5:
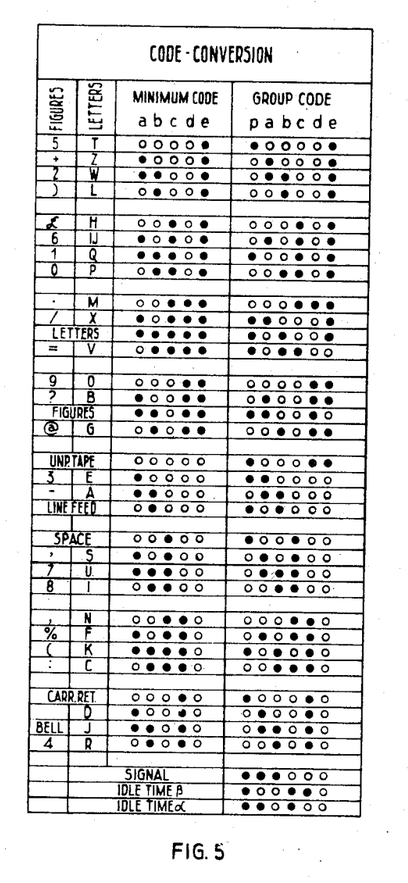
Fig. 5 shows the five units code and the six units code or group code to be formed from it.

In order that signals having this ratio can be transmitted, each signal must be composed of at least seven elements. In the given elaborated example this ratio has been chosen to be 3 marks and 4 spaces. By way of example a code conversion has been chosen as indicated in Fig. 5, in which a space is represented as a hollow circle and a mark is represented as a solid circle. If with this code there are already three marking elements in the signal (for example, the letter W) as it is applied to the code convertor nothing is eventually changed in this signal as a result of the code convertor action under the control of the impulse generator P2. At the output terminal of trigger CT6 there appears a spacing element, which in the subsequent scanning process is the first element to be scanned and is followed by the five elements at the respective output terminals of triggers CT1 to CT5.

It must be remembered that the conversion from a five- to a six-element code must be simply and rapidly accomplished to secure the maximum practical and economic benefits. To this end code trigger CT6 is effective to add a sixth element to each of the five-element code signals. For twenty of the thirty-two five-element code signals, which twenty signals have either two or three marking elements in the five-unit code, trigger CT6 is effective to add a spacing element to the original five elements. This element may be inserted at any arbitrarily chosen position, and for purposes of illustration is added in front of the original five elements. For example, the letter W in the five-element code comprises three marking elements and two spacing elements, and therefore code trigger CT6 will be effective to add a sixth, and spacing, element to the original five.

More specifically, for the letter W, the electrical representation of the marking and spacing symbols in Figure 5 is + + — — +. As has been described hereinbefore, a negative impulse is first coupled from impulse generator P1 to the input terminal of code trigger CT6; accordingly, the output terminal of CT6 is originally in a negative, or minus, condition. The appearance of the signal W in the tape reader TR (Figure 1) causes polarities corresponding to the elements of letter W (+ + — — +) to appear at the output terminals 1-5 of tape reader TR; upon the issuance of an impulse from impulse generator P1, these polarities are coupled to the input terminals of code triggers CT1—CT5, indicated by input terminals 1-5 in Figure 6. These input polarities are + + — — +; accordingly, the output terminals 62—66 assume the same polarities, + + — — +. As indicated above, the output terminal 61 of code trigger CT6 is already in the negative, or minus, position from a prior negative impulse; therefore, at the output terminals of code triggers CT1—CT6, if CT6 is scanned first, the polarities indicating letter W in the six-element group code appear as — + + — — +. It is important to note that the sequence of the original five elements representing letter W in the five-element minimum code has not been altered; only the addition of a spacing element is utilized to transform the letter W from a five-element minimum code signal to the six-element group code signal.

As will be explained more fully hereinafter and particularly with respect to the operation of the invention with respect to the letter Q, the issuance of an impulse from impulse generator P2 does not affect the elements of the letter W by converting any of those elements in the code converter CC, illustrated generally in Figure 1 and in detail in Figure 7. Because the elements of letter W retain their basic form in the output, or six-element, code the same polarities (— + + — — +) appear at the output terminals 61—66 of the code triggers CT1—CT6 after the issuance of the impulse from generator P2. The subsequent utilization of the same five code triggers (CT1—CT5), which originally were used to register elements 1–5 of the five-element minimum code, to provide elements 2–6 of the six-element group code obviously provides a substantial reduction in equipment, operating time, maintenance and equipment costs, and represents a definite advance in the art.

Figure 12:
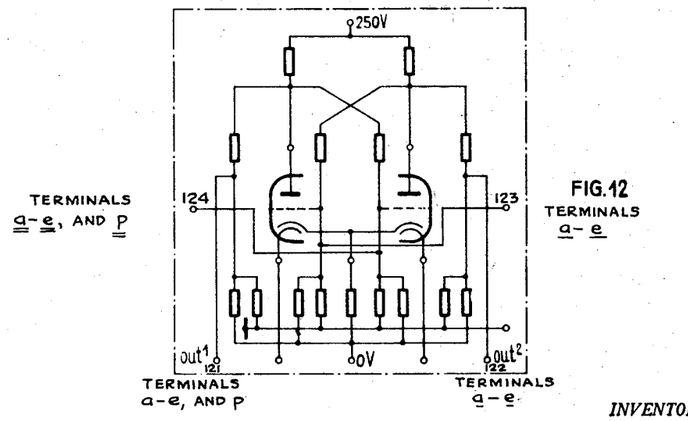
Fig. 12 shows a trigger circuit.

The circuitry of the code triggers CT1—CT6 for accomplishing the foregoing conversion is illustrated in Figure 12 of the drawing. It will be apparent to those skilled in the art that Figure 12 is a multivibrator circuit, and is connected to the other elements of the invention as indicated in Figure 12. The operation and utilization of such circuitry is well known and understood in the art, and needs no explanation in this application.

The output potentials of the code triggers CT1—CT6 are now directed sequentially to the scanning trigger ST under the direction of the distributor A—G; this operation is also well known and understood in the art, and requires no further exposition herein. The output of the scanning trigger ST is coupled through an odd/even detection device illustrated generally as MC in Figure 1 and shown more specifically in Figure 11. Before each series of six elements is coupled to odd/even detector MC, the left hand tube (Figure 11) is conducting. If detection device MC is in this condition after the six elements have been coupled to its input, a marking element is added to the six; if, on the other hand, the right hand tube is conducting after the six elements have been coupled to device MC, a spacing element is added to the first six. The input to device MC is coupled to terminal S of Figure 11; the rectifier arrangement of the detection device is such that with the appearance of each marking element at terminal S the conduction of the left and right hand tubes is altered. That is, with the left hand tube conducting, upon the appearance of a marking element at terminal S, the left hand tube is cut off and the right hand tube begins to conduct; upon the appearance of the next marking element, the right hand tube is cut off and the left hand tube again is conductive, and so forth. It has already been shown that letter W has been translated into the six-element group code and is now represented by — + + — — +. Accordingly, after the transmission of the first element (a space) to device MC, the left hand tube is still conducting; after the transmission of the second element (a mark), the right hand tube is conducting. It is obvious that after the coupling of the third element (a mark), the left hand tube is then conducting, and the appearance of the sixth element (a mark) again causes the right hand tube to conduct. Therefore, after the six elements have been coupled to the input of detection device MC, the right hand tube is conductive, indicating that a spacing element is to be added to letter W of the six-element group code. Accordingly, letter W is translated to the seven-element code by the addition of a spacing element, and when coupled to the transmitter is represented as — + + — — + —.

Simply stated, since each signal in the six-element code has either two or three marking elements; since the detector device MC is always in the same initial position (the marking position), and since only a marking element coupled to device MC changes its output condition, any six-element signal containing two marking elements coupled to device MC leaves the device in the marking condition. Similarly, any six-element signal having three marking elements operates device MC to the spacing condition. Therefore, detector device MC is effective to inspect the six-element code formed by the invention, and then to add the seventh element to construct a seven-element, constant mark/space ratio code. It is clear that the novel detector device provides a single, simple, and expeditious means of formulating a seven-element constant mark/space ratio code.

The ratio detectors at the receiving station for determining the mark/space ratio are well known and widely used in the art; such detectors may be then be used to determine whether or not the transmitted character has been mutilated upon reception of the character at the receiver. It is apparent that, neglecting the first and last elements representing letter W in the seven-element code, the original intelligence embodied in the five-element code remains exactly the same. The operation of the receiver is merely the converse of that occurring at the transmitter, and is effective to translate the incoming signals (after an operation to determine whether or not mutilation has occurred) into the original five-element minimum code. A similar translating action occurs for the other characters having three marking elements in the five-element minimum code.

What is said in the above, consequently, holds for the signals W, Y, P, M, B, G, U, F, C and J of the letters position and for the corresponding signals of the figures position.

If in the signal, as it is applied to the code convertor, there are two marking elements this signal too is eventually passed on unchanged to trigger St as a result of the code convertor action.

This holds for the signals Z, L, H, O, A, S, I, N, D and R and for the corresponding signals of the figures position.

For example, letter Z in the five-element minimum code is represented by + — — — +. After the transmission of a negative pulse from impulse generator P1 (Figure 1) the negative polarity appears at the output terminal 61 of the code trigger CT6 shown in Figure 6. If, under the action of tape reader TR and impulse generator P1, elements representing the letter Z are now coupled to the input terminals of code triggers CT1—CT5, the output terminals of triggers CT1—CT5 are now + — — — +; terminal 61 has retained its negative polarity. Since Z is in the basic code group having two marking elements, as will be explained more fully hereinafter in connection with transmission of the letter Q, the action of impulse generator P2 is not effective to translate the elements representing letter Z in code converter CC (Figure 1). Therefore the polarities appearing at the output of code triggers CT1—CT6 remain unchanged, — + — — — +. The output polarities are fed sequentially to scanning trigger ST, and code trigger CT6 is scanned first so that the element represented by the polarity of output terminal 61 is always the first element scanned. The elements representing letter Z are coupled to the odd/even detection device MC, which is originally in the marking condition with the left tube conductive. After the second element (a marking element) has been coupled to device MC (Figure 11), the left hand tube is cut off and the right hand tube begins to conduct. After the sixth element (a marking element) has been coupled to device MC, the right hand tube is cut off and the left hand tube is then conducting. Accordingly, after the six elements representing letter Z in the six-element group code have been coupled to detection device MC, device MC is in the marking condition. Therefore a marking element is added to the six elements representing the letter Z, so that in the seven-element code the letter Z appears as — + — — — + +. The letter Z may then be scanned as are the other characters, by a 3-4 ratio detector, for mutilation upon reception at the receiver. A similar translating action occurs for the other characters having only two marking elements in the five-element minimum code.

Consequently, if signals of the said two groups of letters and the corresponding signals of the figure position arrive at the code convertor they are passed on unchanged to trigger ST.

Consequently, the order of sequence of the signal elements in most signals of the six units code is similar to the order of sequence of the elements in the original code; the sixth element is only placed before the original code elements.

The remaining 12 signals and the corresponding signals of the figures position as they are applied to the code convertor do not contain two or three marking elements, like the above-mentioned ones. The number of marking elements of these signals amount to five (letters), four (Q, X, V, figures, K), one (T, E, line-feed, space, carriage return), or none (unperforated tape).

These signals will be so treated by the code convertor that in the six units code they contain two or three marking elements as well.

If one of the last-mentioned twelve signals and the corresponding signals of the figures position arrive at the code convertor, a preassigned one of the rectifier circuits or check means 13, 19, etc., establish a current flow over the associated rectifier set or transformation means 14, 20 which in turn are connected to couple signal voltages to the input terminals of the ones of the code triggers connected thereto under the control of the impulse generator P2, as a result of which at the output terminals there appear the signals of the six units code indicated in the last column of Fig. 5.

After this conversion into the six units code these signals have either two or three marking elements.

The signals which originally contained one marking element, viz. the signals T, E, line feed, space and carriage return and the corresponding signals of the figures position, contain two marking elements then. This has been obtained by the addition of a marking element as initial element. The order of sequence of the resulting five elements is again similar to the order of sequence of the elements of the five units code.

The signal which originally contained no marking element (unperforated tape) contains three marking elements then. The signals which originally contained four marking elements (Q, X, V, figures, K) and the corresponding signals of the figures position contain three marking elements then. The signal which originally contained five marking elements (letters) contains three marking elements then.

Only in the last-mentioned seven elements the original order of sequence of the intelligence elements is lost in the conversion into the six units code.

Of this last group of 12 signals and of the corresponding signals of the figures position those having in the six units code an even number of marking elements are provided by parity conversion means MC with a marking element as seventh element, whereas those having in the six units code an odd number of marking elements are provided with a spacing element as seventh element.

For example, the letter Q in the five-element minimum code appears as + + + — +. After the negative pulse has been coupled from impulse generator P1 to the input terminal of the code trigger CT6 (Figure 6), the electrical elements representing the letter Q are then coupled from tape reader TR to the input terminals of code triggers CT1—CT5. After the elements representing the letter Q have been thus coupled, the output polarities of terminals 61—66 of Figure 6 appear as — + + + — +.

Figure 6:
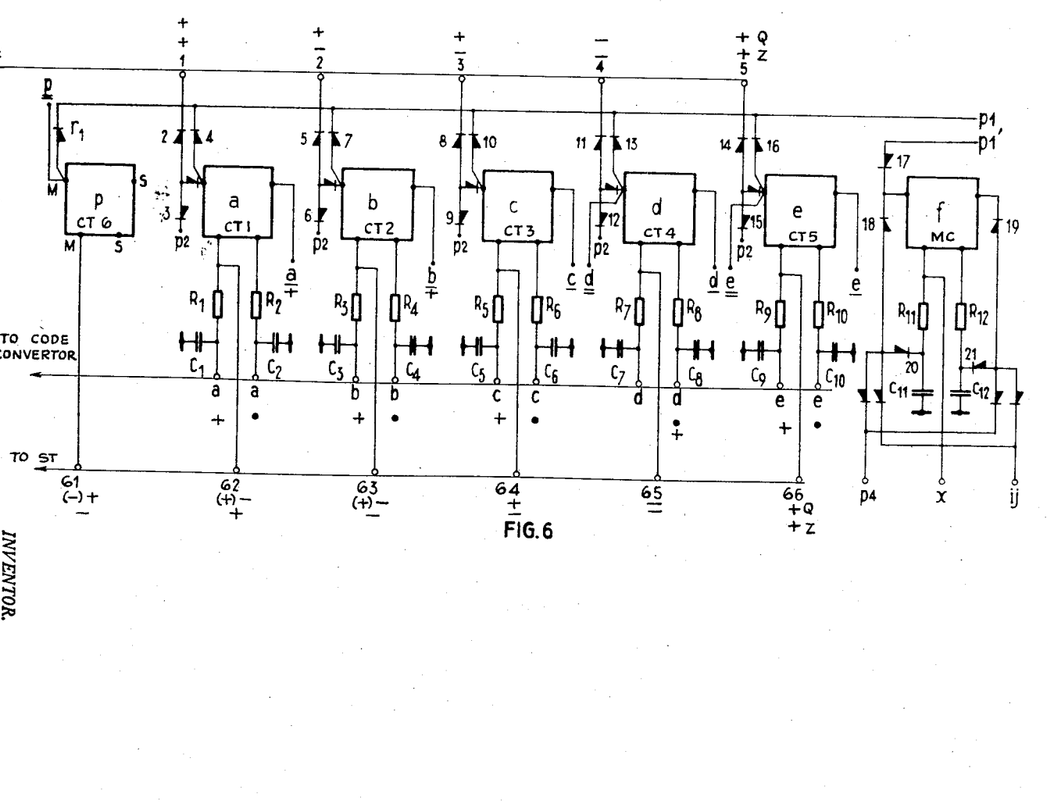
Figs. 6 and 7 show in detail an embodiment of certain parts of the transmitter.

In more detail, each one of the code triggers CT1—CT5 illustrated in block form in Figure 6 is also shown in detail in Figure 12. Referring to Figure 6, it is apparent that each one of the code triggers CT1—CT5 has two output terminals such as $a, \overset{.}{a}, b, \overset{.}{b}$, etc. Code trigger CT1, for example, has output terminals $a$ and $\overset{.}{a}$. It is apparent that if the left tube in the multivibrator CT1 is conducting, the plate potential of that tube will be low, and the output polarity indicated at point $a$ will be a negative polarity. Similarly, while the left hand tube conducts the plate potential of the right hand tube is substantially higher, and a positive output potential appears at point $\overset{.}{a}$. Therefore, each of code triggers CT1—CT5 has two output terminals, which in operation will always indicate a positive polarity on one and a negative polarity on the other. If an input pulse is coupled to one of the code triggers so as to alter the conduction of the tubes therein, the respective output polarities for that stage are reversed. Thus, it is obvious that the five code triggers provide ten possibilities of coupling output potentials, indicative of the state of the particular code triggers, to associated equipment.

Figure 7:
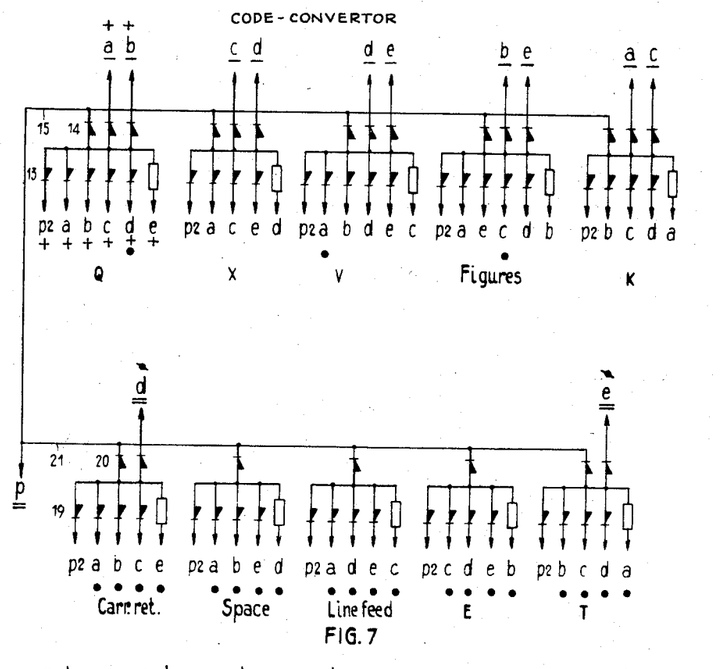

As has already been mentioned, certain signals of the five-element minimum code are not capable of direct translation into the six-element group code having either two or three marking elements, and these signals must have their information content altered in code converter CC, illustrated generally in Figure 1 and in more detail in Figure 7. Figure 7 shows a battery of rectifier cells or diodes employed to effect the change in information content in certain of the five-element code signals. Each bank is connected to recognize a predetermined one of the signals which must be converted, and specifically are operative to recognize its assigned signal whenever the instantaneous polarities of the impulses coupled to the lower arrowheads in each battery of rectifiers shown in Figure 7 are positive. Unless this condition is met, conversion of the five-element code character by operation of the code converter CC does not occur upon the issuance of an impulse from impulse generator P2.

Let us assume, for example, that the signal Q is to be converted from the five-element to the six-element code. A negative pulse has already been coupled to code trigger CT6, and accordingly output terminal 61 (Figure 6) exhibits a negative, or minus, polarity. Upon the issuance of an impulse from impulse generator P1, the electrical signals representative of the signal Q are coupled to input terminals 1—5. The character Q is represented by + + + — +, and these polarities therefore appear at output terminals 62—66. Therefore, the output terminals 61—66, after the elements representing signal Q in the five-element code are coupled to the input terminals, appear as — + + + — +. It therefore appears that positive polarities also are present at the output terminals $a, b, c, d$, and $e$ of code triggers CT1—CT5, while negative polarities appear at output terminals $\overset{.}{a}, \overset{.}{b}, \overset{.}{c}, \overset{.}{d}$ and $\overset{.}{e}$. These polarities are of such nature and position that, in conjunction with a positive impulse from impulse generator P2, a conversion of the five-element signal Q is effected in code converter CC.

It has been shown that after elements representing signal Q in the five-element code are coupled to code triggers CT1—CT5, the positive polarities appear at output terminals $a, b, c, d$, and $e$. The rectifier cells or diodes utilized to effect conversion of signal Q are shown in the upper left portion of Figure 7. It is apparent that positive polarities are coupled to points $a, b, c, d$ and $e$; upon the coupling of a positive pulse from impulse generator P2, positive pulses are connected to each of the terminals represented by the arrows at the lower portion of the rectifier cells. This condition effects the coupling of positive polarities to points $a$ and $b$, as well as to conductor 15. Points $\overset{.}{a}$ and $\overset{.}{b}$ are also shown to the right side of code triggers CT1 and CT2 in Figure 6; the coupling of these positive output pulses from the rectifier cell group is effective to alter the conduction of the multivibrator stages in code triggers CT1 and CT2, and thereby reverse their output polarities. Accordingly, in code trigger CT1, output terminal $a$ becomes negative and output terminal $\overset{.}{a}$ becomes positive; the same is true for code trigger CT2. Therefore, the output polarities appearing at terminals 62 and 63 are altered from the original positive condition to exhibit a negative polarity. Likewise, the positive impulse transmitted to conductor 15 (Figure 7) is coupled to point $p$, which is also shown in Figure 6 connected to the input terminal M of code trigger CT6. Therefore, the output polarity of code trigger CT6 is likewise altered, coupling a positive output polarity to terminal 61. A scansion of the output polarities of code triggers CT1—CT6 now yields the polarities; + — — + — +. These six elements now represent the signal Q in the six-element code. These elements are then coupled under the direction of the distributor A—G to scanning trigger ST, and then into odd/even detection device MC, in the same manner as were the six-element characters Z and W. The detection device MC (Figure 11) was originally in the marking condition, and after the appearance of three marking elements (the first, fourth, and sixth) in the character Q the device MC will be in the spacing condition, with the right hand tube conducting. Accordingly, the seventh element added to the six-element character Q will be a spacing element, and letter Q will then appear in the seven-element code as + — — + — + —.

Figure 3:
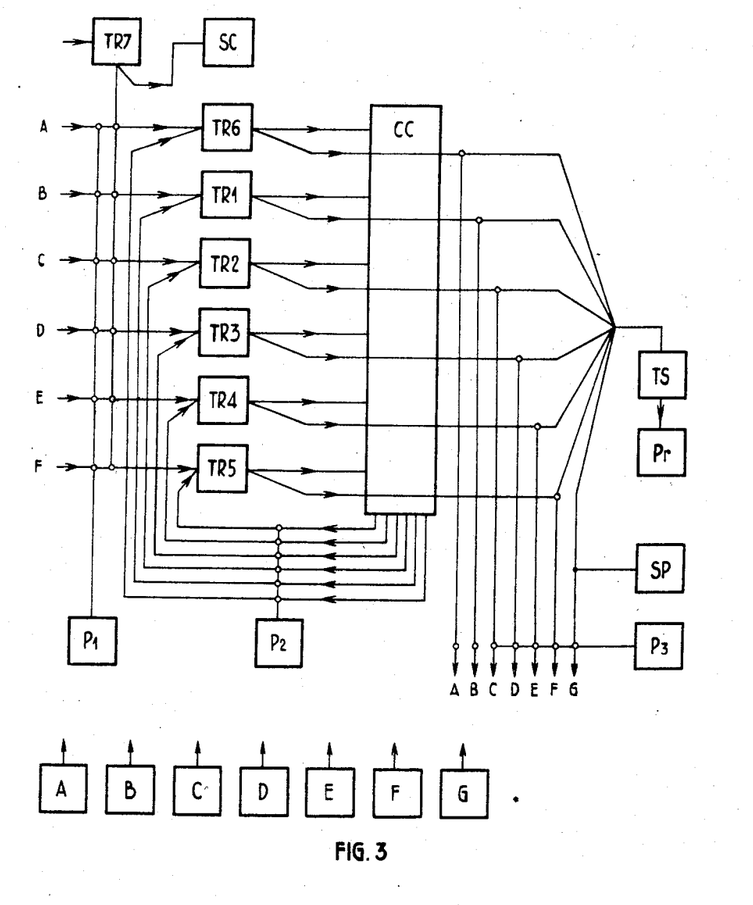
Fig. 3 gives a block diagram of the receiver.

The character Q is then transmitted to the receiver of the invention as illustrated in Figure 3. The seven elements representing the letter Q are transmitted to the output terminal of code trigger TR7. The output terminal of code trigger TR7 is connected to the input terminals of each of triggers TR1—TR6. The first six elements of the character are applied successively to the respective input terminals of code triggers TR6, TR1, TR2, TR3, TR4 and TR5, in this sequence. This application is under the control of impulse generator P1. The seventh element of the group representing the character Q remains in code trigger TR7, the output terminal of which is also connected to a trigger circuit SC which is operative to scan the incoming intelligence to determine whether or not the received character has the correct mark/space ratio (in this instance, 3/4).

As the mark/space ratio is determined to be correct, the polarities indicative of the first six elements are coupled to the input terminals of code triggers TR6 and TR1—TR5. For the letter Q, these polarities are represented as: + — — + — +. These polarities are coupled to the input terminals of code triggers TR6 and TR1—TR5, as indicated by the common liners in Figure 8. Thus terminals 81—86 in Figure 8 immediately exhibit the polarities + — — + — +, in accordance with the signal coupled from the code trigger TR7.

Figure 8:
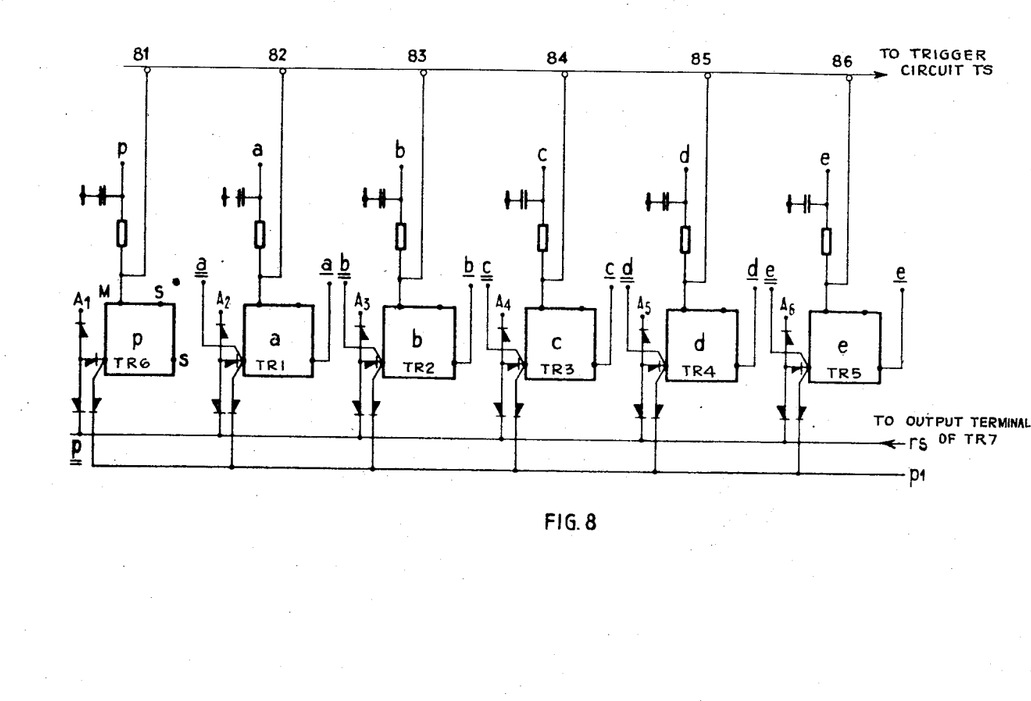
Figs. 8 and 9 show in detail an embodiment of certain parts of the receiver.
Figure 9:
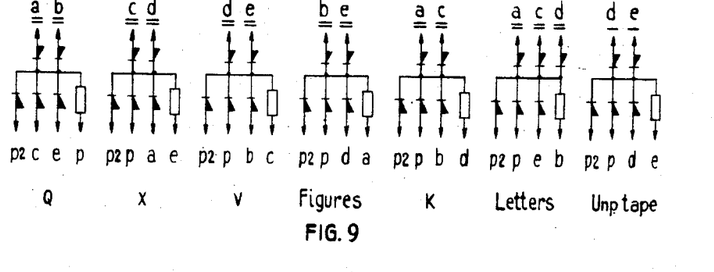

The rectifiers incorporated in code converter CC illustrated generally in Figure 3 are shown in detail in Figure 9. Referring in particular to the battery of rectifiers representing the character Q, it is apparent that the polarities appearing at output terminals 84, 86, and 81, of Figure 8 are coupled through suitable resistors to points c, e, and p, respectively, which points are illustrated in both Figures 8 and 9. With the issuance of a positive pulse by impulse generator P2 (Figure 3), a positive potential is applied to terminal P2 indicated in the battery of rectifiers for translating the letter Q in Figure 9. Thus the necessary condition precedent for conversion by altering the intelligence content has been met, by the presence of positive elements or pulses at each of points p2, c, e, and p, in rectifier bank Q of Figure 9. Thus, positive potentials are coupled to $a$ and $\bar{b}$, as illustrated in Figure 9, and also in Figure 12; that is, these potentials are coupled to terminals 124 of Figure 12. Accordingly, code triggers TR1 and TR2 have their output potentials altered from minus (—) to plus (+) by the action of the rectifier cells illustrated in Figure 9. The polarities now appearing at the output terminals 81—86 in Figure 8 are + + + + — +. Upon scanning the output terminals for the polarities appearing thereat, it is apparent that, if the polarity of the first terminal 81 is disregarded (in practice, this is true; it is used only as a start element), the potentials appearing at terminals 82—86 are identical to the polarities which originally signified the character Q in the five-element minimum code (+ + + — +). Accordingly, it is apparent that the invention has successfully translated the letter Q from the minimum code into the six-element group code by changing the order of marking and spacing elements and adding another element, and has translated the six-element character back into the original, five-element character. It is also apparent that such translation is not required for most of the signals, such as Z and W, for which the original order of intelligence is preserved when translated into the six and seven-element codes. Translation at the receiver from one sequence of elements to another is only necessary for the characters Q, X, Z, K, figures, letters and unpunched tape, as indicated in Figure 9. The remaining 25 characters of the original 32 character code are readily translated from the six to the five-element code without any operation in code converter CC illustrated in Figure 3 and in detail in Figure 9. After this translation to the five-element code, the operation of impulse generator P3 in cooperation with the scanning distributor A—G is effective to couple the elements representing the five-element code to the trigger TS, which in turn controls the printer Pr. The operation of these associated units is well known and understood in the art.

Thus all the signals in the six units code are sent, element after element, to the scanning trigger ST, under the control of the distributor consisting of the triggers A, B, C, D, E, F, G and the impulse generator Sc.P. The scanning trigger passes the six elements on to the transmitter.

The scanning trigger is also connected to a trigger circuit MC, which counts the marking elements in each signal sent to the transmitter. If this number is even, the trigger circuit MC puts the scanning trigger ST, after the issue of the sixth element in the marking condition, so that the latter circuit gives as seventh element a marking element. If this number is odd, the trigger circuit MC puts the scanning trigger ST, after the issue of the sixth element, in the spacing condition, so that the latter gives as seventh element a spacing element.

It results from what has been said that the signal is first stored in the five units code in a set of switching units, to wit the set of code triggers CT1 to CT6, and that afterwards the signal is issued in the six units code at the output terminals of the same code triggers.

Figure 2:
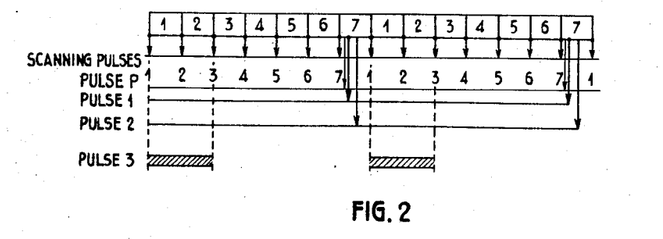
Fig. 2 gives a time diagram pertaining to the transmitter.

In apparatus so far known two sets of switching units are used for this conversion. Fig. 2 shows the time relations between the various impulse generators in connection with the signal to be transmitted.

The lengths of the partitions 1 to 7 indicate the durations of the successive seven elements eventually transmitted.

The Figures 1 to 7 under the vertical arrows indicate the moments at which scanning impulses are produced by the impulse generator Sc.P.

In fact these impulses occur a very short time later than is indicated.

At the moment indicated by a vertical arrow intersecting the horizontal line designated by "pulse P," the impulse generator P1 couples a negative impulse to the input terminal of CT6.

At the moment indicated by a vertical arrow intersecting the horizontal line designated by pulse 1 the impulse generator P1 gives an impulse.

At the moment indicated by a vertical arrow intersecting the horizontal line designated by pulse 2 the impulse generator P2 gives an impulse.

The duration of the operation of impulse generator P3 is indicated by sloping dashed lines on a horizontal line designated by pulse 3.

As appears from the figure the duration of the seventh element is used to give the impulse generator P1 the opportunity of applying a next signal to the input terminals of the code triggers.

A few moments later an impulse appears from P2, as a result of which voltages are sent back from the output terminals of the code convertor to the input terminals of the code triggers, which at their output terminals produce the six units signal.

Then the signal can be scanned by means of the distributor consisting of the triggers A to G and the impulse generator Sc.P, which, element after element, passes on the signal to the transmitter.

Fig. 3 gives a block diagram of the receiver. In the receiver parity detector means test each incoming signal to find out whether the seven elements exhibit the correct mark/space ratio.

If this is the case the first six elements, forming the six units signal, are converted into the original five units code. The equipment adds a start before the signal and a stop behind it, after which the signal is sent to the printer.

If the incoming signal does not exhibit the correct mark/space ratio, a request for repetition is automatically transmitted and the printer is temporarily blocked (as this matter does not form part of the invention, it will not be gone into).

The seven elements of which each signal on the transmission path consists, are successively applied to the input terminal of signal absorbing trigger TR7. The output terminal of trigger TR7 is connected to the respective input terminals of triggers TR1 to TR6. Trigger TR7 applies the six elements successively to the respective input terminals of triggers TR6, 1, 2, 3, 4, 5 (in this order of sequence) under the control of an impulse generator P1. The seventh element remains in the trigger TR7.

The output terminal of trigger TR7 is also connected to the trigger circuit SC. This trigger circuit SC finds out whether the seven elements have the correct mark/space ratio.

If this is the case voltages are applied, under the control of the impulse generator P2, from the respective output terminals of the code triggers TR1 to TR6 via a code convertor CC to the input terminals of the triggers, so that at the output terminals of these triggers the signal appears in the original five units code, preceded by a start element.

Thus trigger TR6 issues at its output terminal the start element, triggers TR1 to TR5 issue at their respective output terminals the five elements of the original code. Under the control of a distributor consisting of triggers A to G, in co-operation with the impulse generator P3 these six elements are successively led to trigger TS. The device SP provides the stop element. The output terminal of trigger TS is connected to a printer Pr, by which the signal is printed.

Figure 4:
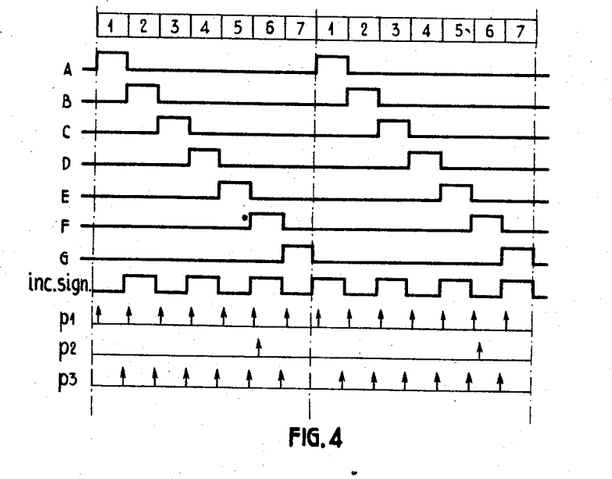
Fig. 4 gives a time diagram pertaining to the receiver.

Fig. 4 shows the time relations between the various voltages and impulses occurring in the receiver. The first line gives a time division, in which each partition represents the duration of an element. Lines A to G indicate when the respective triggers A to G of the distributor give an impulse. In co-operation with impulses from impulse generator P3 these impulses control trigger TS.

The next line shows an arbitrary incoming signal. Two signals are shown, it being assumed that spacing elements alternate with marking elements.

Line P1 shows the moments at which trigger P1 gives an impulse. Such an impulse appears at a moment following the arrival of a signal element at trigger TR7. Under the control of these impulses in co-operation with the distributor the first six elements are applied to the respective code triggers in the following order of sequence: TR6, 1, 2, 3, 4, 5, all the seven elements being applied to the trigger circuit SC, which must check the mark/space ratio of these seven elements.

Line P2 shows the moments at which the trigger P2 gives an impulse. These impulses occur a moment after the sixth element has been applied to the code trigger TR5.

Under the control of these impulses voltages are sent back from the respective output terminals of code triggers TR1 to TR6 to the respective input terminals of these triggers, after which the signal appears in the original five units code at the output terminals of the same triggers, trigger TR6 providing the start element. If just after the arrival of the seventh element device SC finds faulty reception, the relevant signal is not printed, because the printer is blocked then.

Line P3 indicates the moments at which impulses are issued by the impulse generator P3. Under the control of these impulses the signal, preceded by a start element is passed on, element after element, to trigger circuit TS and printer Pr.

These impulses appear just before the impulses from P1. As a result of this the signal element belonging to a preceding signal and stored in the trigger is passed to the printer first, after which a new element of a next signal is stored in the trigger.

When the start element and the five intelligence elements have been sent to the printer, the device SP, under the control of the distributor, ensures the addition of a stop element.

In Fig. 5 one column gives all the signals of the five units code, another column giving these signals in the six units code to be formed. It results from this figure that with 20 out of 32 signals the signal in the six units code is formed from the signal in the five units code by simply placing a spacing element before it (column p for letters Z, W, L, H, Y, P, M, O, B, G, A, S, U, I, N, F, C, D, J, R and the corresponding signals of the figures position). With 5 signals the conversion is obtained by simply placing a marking element in front (T, E, line feed, space, carriage return and the corresponding signals of the figures position).

With the remaining 7 signals the conversion is such that the signals in the six units code contain either two or three marking elements (Q, X, letters, V, figures, unperforated tape, K and the corresponding signals of the figures position).

Figs. 6 and 7 show in more detail the transmitter according to Fig. 1. In Fig. 6 the boxes designated by $a$ to $e$ correspond to the code triggers CT1 to CT5 in Fig. 1.

The input terminals of these triggers numbered 1 to 5 at the top of Fig. 6 are connected to the 5 output terminals of the tape reader TR in Fig. 1.

The box $p$ in Fig. 6 corresponds to the code trigger CT6 in Fig. 1.

The box $f$ in Fig. 6 corresponds to the even/odd counting device MC in Fig. 1.

The output terminals of boxes $a$ to $e$, and $p$, designated by Figures 1 to 6 at the bottom of Fig. 6 are connected to the input terminal of scanning trigger ST in Fig. 1.

The output terminal $x$ of box $f$ in Fig. 6 corresponds to the conductor connecting the output terminal of MC to the input terminal of ST in Fig. 1. The other terminals of boxes $a$ to $e$, terminals designated in Fig. 1 by letters $a$ to $e$, $a$ to $e$ with a black dot under the letters, $a$ to $e$ once underlined, $a$ to $e$ twice underlined and $p$ twice underlined are connected to the correspondingly marked points in Fig. 7, which shows the rectifier circuits contained in the code convertor CC in Fig. 1.

The rectifier circuits and the RC circuit of Fig. 6 are also contained in this code convertor CC in Fig. 1.

Figs. 8 and 9 show in more detail a part of the receiver according to Fig. 3. In Fig. 8 the boxes designated by $a$ to $e$, and $p$, correspond to the signal input means code triggers TR1 to TR5 and TR6, respectively, in Fig. 3.

Point $rs$ in Fig. 8 is connected to the output terminal of trigger TR7 in Fig. 3. Points 1 to 6 at the top of Fig. 8 lead to the trigger circuit TS in Fig. 3.

The output terminals of boxes $a$ to $e$ and $p$ are designated by letters $a$ to $e$, letters $a$ to $e$ once underlined, letters $a$ to $e$ twice underlined, letter $p$ and letter $p$ twice underlined, and lead to points designated by corresponding letters in Fig. 9.

The check means and signal generator circuits and the RC circuits in Figs. 8 and 9 are contained in the code convertor CC in Fig. 3 much in the manner of the code converter of Figure 1.

Figures 10, 13, 14, 15:
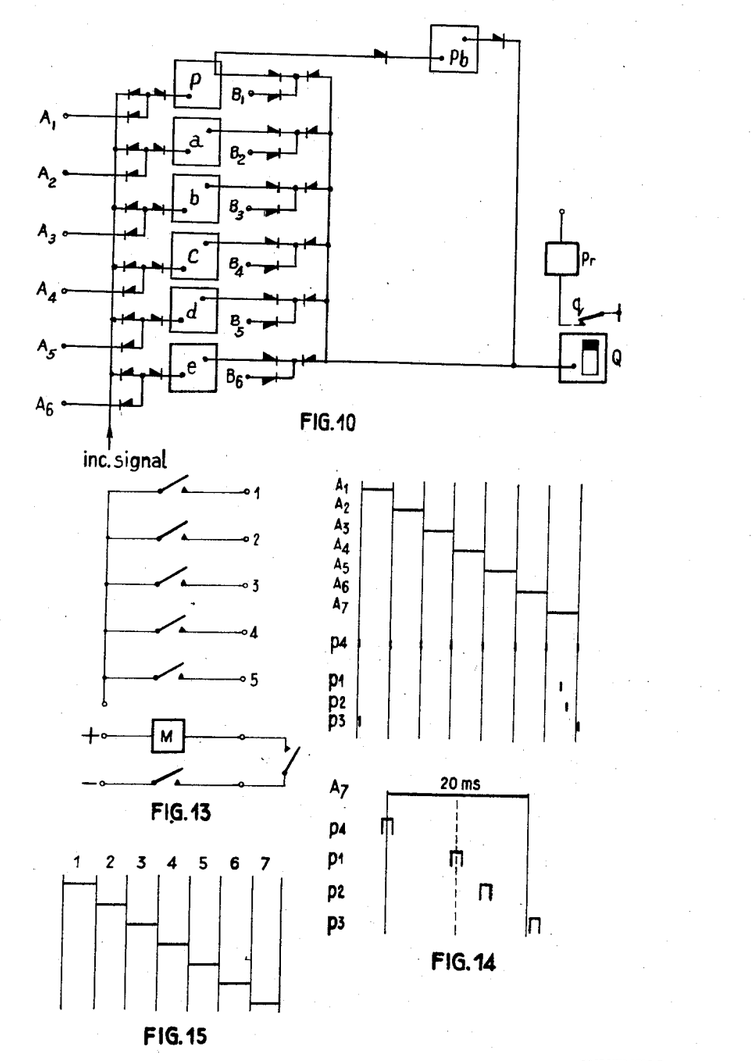
Fig. 10 gives a survey of a part of the receiver.
Fig. 13 shows diagrammatically a tape reader.
Fig. 14 gives a time diagram of a main distributor in a transmitter.
Fig. 15 gives a time diagram of a main distributor in a receiver.

Fig. 10 gives a general view of the receiver as has already been dealt with in preceding figures. P$b$ represents the device which blocks the printer if the reception is found to be faulty. P$r$ represents the printer and Q represents the accessory relay.

Figure 11:
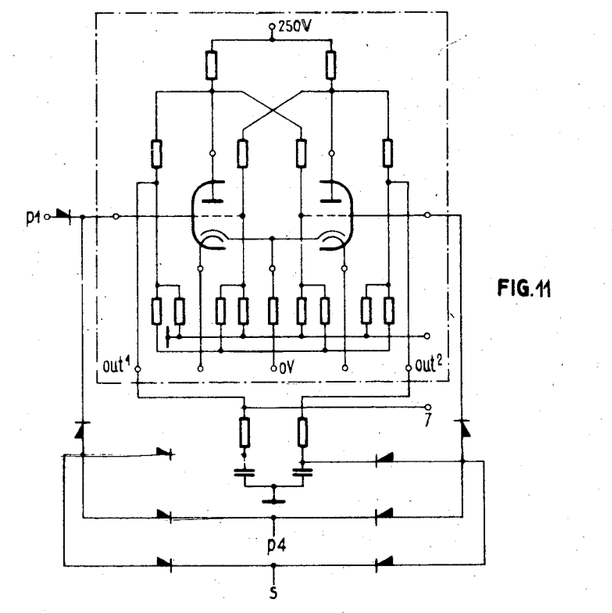
Fig. 11 shows the counting device, which in the transmitter counts whether the number of marking elements in the signal according to the six units code is even or odd.

Fig. 11 gives a diagram of the even/odd counting device MC of the transmitter (Fig. 1) including detector means comprising a pair of tubes and associated circuitry connecting same for operation in a bistable manner, the tubes being operative between the two stable positions only responsive to the application of a marking element thereto. The output terminal of the scanning trigger ST (Fig. 1) applies the signal elements successively to point S (Fig. 11), being the input terminal of the counting device.

The output terminal of the counting device is the point designated by out$^2$. From this point under the control of trigger A7 of the distributor (A7 corresponds to G in Fig. 1) and in co-operation with the impulse P4, the extra element added to the six code elements on the transmission path is sent to the scanning trigger ST of Fig. 1.

At point P1 there appears the impulse P1, which puts the circuit at regular intervals in the initial condition, in which e.g. the first tube is conductive. Signal generator means comprising load resistors in the anode circuits of the bistable tube pair couple the marking and spacing elements to the output terminals.

If in the initial state the first tube is conductive, the anode of the first tube has a low potential. The second tube is non-conductive then and, consequently, the anode of this tube has a high potential. This high potential reigns at point out$^2$ and corresponds to the marking polarity.

The rectifier circuit in this figure is such that only a marking element applied to the terminal designated by S can cause the circuit to change condition.

Supposing a signal arrives at terminal S, consisting of: mark, space, space, mark, space, space, the polarities at terminal out$^2$ will be as follows: space, space, space, mark, mark, mark.

Thus the additional element supplied via the scanning trigger ST of Fig. 1 to the transmitter will be a marking element and the signal sent on the transmission path will have three marking elements and four spacing elements.

Supposing a signal arrives at terminal S, consisting of: mark, space, space, mark, mark, space, the polarities at terminal out$^2$ will be as follows: space, space, space, mark, space, space.

Thus the additional element supplied via the scanning trigger to the transmitter will be a spacing element and the signal sent on the transmission path will have three marking elements and four spacing elements again.

Fig. 12 represents a general trigger circuit as is used in the equipment in all those cases where a trigger is mentioned in the description. Such a circuit has two stable states of equilibrium.

Fig. 13 shows diagrammatically a tape reader.

Fig. 14, upper part, gives a time diagram of the main distributor and the transmitter, showing the moments at which the various impulses mentioned in the description occur.

In Fig. 14, lower part, the duration of the additional element is shown in an enlarged form. In it the impulses occurring during that interval are indicated in the proper order of sequence.

Fig. 15 gives a time diagram of the receiver distributor as described already in connection with Fig. 4.

In the elaborated example it has been assumed that in the conversion from the five units code into the six units code the sixth element is placed before the five elements of the five units code. It is obvious that the invention need not be restricted to the location of the sixth element at this place, but that it can be inserted in any arbitrary place into the existing order of sequence.

Likewise the additional element provided for obtaining the protection on the transmission path and which, in the example, is placed after the six elements of the six units code, is actually not tied to this place. If it is put in another place, however, the transmission of a signal must be suspended until the additional element is known.

What is claimed is:

1. In a system for effecting the transmission of coded signals comprised of marking and spacing elements including input means for receiving signals in a first code having a variable number of marking elements, a code converter including signal responsive means connected to said input means operative responsive to the coupling of the signals of said first code thereto over said input means to add at least one element to each of said signals of a polarity to convert same into the signals of a second code having alternatively a first and a second number of marking elements, and parity conversion means connected to the output side of said code converter for converting said second code into a third code including detector means operative to detect the number of marking elements in each signal of said second code as coupled to said detector means, and signal generator means connected to said detector means operative to add at least one element of one polarity to the signals having said first number of marking elements and at least one element of a second polarity to signals having said second number of marking elements to provide a code in which each signal has the same number of marking elements.

2. In a system for effecting the transmission of coded signals including input means for receiving signals in a first code, each signal having a fixed total number of elements and a variable number of marking and spacing elements, a code converter means including signal responsive means coupled to said input means operative to convert said signals of said first code into a second code having a variable number of marking and spacing elements, the limits of the variation in the number of marking elements in the signals of the second code being limited to a first and second predetermined number, and parity conversion means including detector means connected to said code converter means operative to determine the number of marking elements in each output signal in said second code coupled thereto by said code converter means, and signal generating means connected to said detector means operative to add at least one element to each signal of a polarity to convert each of said signals of said second code into a third code in which each signal has a number of mark and space elements of a predetermined ratio.

3. In a system for effecting the transmission of coded signals including input means for receiving signals in a first code, each signal having a fixed number of elements and a variable number of marking and spacing elements, a code converter means coupled to said input means operative responsive to receipt of said signals of said first code over said input means to convert said signals into a second code having a second fixed number of elements and alternatively $p$ and $p-1$ marking elements including signal means operative to add at least one element to each signal received by said code converter means, check means connected to said signal means operative to detect each signal as thus converted which has less than $p-1$ elements and more than $p$ elements, including transformation means operative to generate for each such signal detected, a predetermined combination of elements having alternatively $p$ and $p-1$ marking elements, and parity conversion means including detector means connected to said code converter means operative to detect the number of marking elements in each signal in said second code, and signal generator means connected to said detector means operative to add a fixed number of elements to said signals of said second code of a polarity to convert said signals into a third code in which each signal has a third fixed number of elements and a number of mark and space elements of a predetermined ratio.

4. In a system for effecting the transmission of coded signals including input means for receiving signals in a five-element code having a variable number of marking and spacing elements, a code converter means coupled to said input means operative to convert said five-element code signals into six-element code signals of alternatively a $p$ and a $p-1$ number of marking elements including a signal means operative to add at least one element to each signal received by said code converter means, check means connected to said signal means operative to detect each signal as thus converted which has less than $p-1$ elements and more than $p$ elements including transformation means connected to said check means operative to generate for each such signal detected, a predetermined combination of elements having alternatively $p$ and $p-1$ marking elements, and parity conversion means including detector means connected to said code converter means to detect the number of marking elements in each signal in said six-element code, and signal generator means connected to said detector means to add at least one element to each signal of a polarity to provide signals in a seven-element code in which each signal has $p$ marking elements and a predetermined ratio of marking and spacing elements.

5. In a system for effecting the transmission of coded signals comprised of marking and spacing elements including input means for receiving signals in a five-element code, a code converter means connected to said input means operative to convert said five-element code signals as received over said input means into six-element code signals having alternatively $p$ and $p-1$ marking elements, including signal means operative to add at least one element to each five element signal received by said code converter, check means operative to detect each signal as thus converted which has less than $p-1$ elements and more than $p$ elements including transformation means operative to generate for each such signal detected, a predetermined combination of elements having alternatively $p$ and $p-1$ marking elements, and parity conversion means including detector means connected to said code converter means operative to detect the number of marking elements in each of said signals of said six-element code, and signal generator means operative to add one element to each signal to convert the signals into a seven-element code in which each signal has at least $p$ marking elements.

6. In a signal transmission system means for transmitting signals over an outgoing path including input means over which incoming signals are received in a first code, a plurality of trigger units, signal coupling means for applying the incoming signals to the input side of said trigger units, code converter means coupled to the output side of said trigger units for converting the output signals of said trigger units into the corresponding signals in a second code, control means for applying the output signals of said converter to the input side of said trigger units, and distributor means for thereafter connecting the output side of said trigger units to said output path.

7. In a system for effecting the conversion of incoming coded signals having $n$ elements to signals of a code having additional elements prior to transmission over an outgoing path, input means over which said incoming signals are received, a set of at least $n+1$ trigger units, signal coupling means for applying the $n$ elements of each incoming signal to the input side of $n$ trigger units of said set, code converter means coupled to the output side of the $n$ number of said trigger units to convert the output signals of $n$ trigger units into the corresponding signals in a second code having $n+1$ elements, means for applying the signal outputs of said converter to the input side of the $n+1$ trigger units, parity conversion means, and distributor means for connecting the output side of the $n+1$ trigger units to said parity conversion means.

8. An arrangement as set forth in claim 7 in which the incoming signals are divided into two groups, means in the code converter for detecting the assigned group of each incoming signal, means for controlling the $n+1$ trigger to provide one predetermined type of signal element whenever the signal is in the first group and a different type of signal element whenever the signal is in the second group.

9. In a system for effecting conversion of incoming coded signals having $n$ elements to signals of a code having $n+1$ elements and thereafter to signals having $n+2$ elements for transmission over an output path, input means over which said incoming signals are received, a set of at least $n+1$ trigger units, signal coupling means for applying the $n$ elements of each incoming signal to the input side of $n$ trigger units of said set, code converter means coupled to the output side of said $n$ trigger units for converting same into the corresponding signals in a second code, means for applying the signal outputs of said converter to the input side of the $n+1$ trigger units, distributor means for connecting the output side of the $n+1$ trigger units to said output path, and parity conversion means connected to said output path including detector means operative to determine the number of marking elements in each signal coupled to said path by said distributor means, and signal generating means connected to said detector means for converting said signals into a third code in which each signal has a predetermined mark/space ratio.

10. In a telegraph system, a transmitter station including input means for providing signals in a first code having a variable number of marking elements, a code converter means operative to convert the signals of said first code into the signals of a second intermediate code having alternatively a $p$ and $p-1$ number of marking elements including a signal means operative to add at least one element to each signal received by said code converter, check means operative to detect each signal as thus converted having less than $p-1$ elements and more than $p$ elements including transformation means operative to generate for each such signal detected, a predetermined combination of elements having alternatively $p$ and $p-1$ marking elements, parity conversion means connected to said code converter means operative to add an element to each signal of said second code of a polarity to convert the signals of said second code into a third code in which each signal has $p$ marking elements, a receiving station, channel means connecting said transmitter and said receiving stations, parity check means at said receiving station including signal absorbing means operative to absorb the added element of said signals as received in said third code to convert said signals into the signals of said second code, code converter means operative to absorb the added element of the signals of said second code which were converted from the signals of said first code by the addition of an element and to reform said signals which were transformed in the translation to the intermediate code, and means for extending said converted signals to associated equipment for printing purposes.

11. In a signal transmitting system wherein signals in a first code having a variable number of marking and spacing elements are converted into signals of an intermediate code having a predetermined number of additional elements and thereafter into a code having a fixed ratio of marking and spacing elements by adding a parity conversion element, receiver means including input means over which the fixed ratio signals are received, parity check means including pulse absorbing means connected to said input means operative to absorb the parity conversion element added to each signal to convert the incoming signals into said intermediate code in which said signals include alternatively a first and a second number of marking elements, and code converter means connected to said pulse absorbing means operative to convert said signals from said intermediate code into signals of said first code in which the signals have a variable number of marking elements.

12. In a signal transmission system in which signals of a first code having a variable number of marking elements are converted into signals of an intermediate code having alternatively a first and a second number of marking elements, and thereafter are translated into a third code by adding a parity element to each signal to provide signals of a fixed ratio code for transmission over a channel; receiver means connected to said channel including pulse absorbtion means operative to remove the added element from each signal as received over said channel to convert same into said intermediate code, and code converter means for converting said intermediate code signals into said first code for use with associated printing equipment including means for prefixing each converted signal with a start element and adding a stop element suffix to each converted signal.

13. In a system for effecting the transmission of coded signals comprised of marking and spacing elements including input means for receiving five-element signals having from zero to five marking elements in each signal, a code converter operative to convert said five-element code signals into six-element code signals, each of which has alternatively two and three marking elements therein, parity conversion means including detector means operative to detect the number of marking elements in each signal in said six-element code, and signal generator means operatively controlled by said detector means to add an element to each signal of said second code of a polarity to provide each signal with the same number of marking elements, an output path, and distributor means for transmitting said converted signals over said output path.

14. In a system for the transmission of signals, a code converter, input means for connecting five-element code signals thereto, and code converter means connected to said input means including signal means operative to add a predetermined number of elements to each five element signal received by said code converter means, check means operative to detect each signal as thus converted having less than $p-1$ elements and more than $p$ elements, including transformation means connected to said check means operative to generate for each such signal detected, a predetermined combination of elements having alternatively $p$ and $p-1$ marking elements.

15. In a signalling system, a code converter for converting signals from a first code having a variable number of marking elements into a second code having alternatively $p$ and $p-1$ marking elements, input means for supplying signals of said first code thereto, signal means in said converter operative to add a predetermined number of elements to each basic signal of said first code as received, and check means connected to said signal means operative to detect each of the signals as thus modified which have more than $p$ marking elements and less than $p-1$ marking elements, and transformation means operative responsive to detection of one of such signals to alter predetermined ones of the elements of the modified signal to preassigned values to provide a signal in said second code having alternatively $p$ and $p-1$ marking elements.

16. In a signalling system, a code converter for converting signals from a first code into a second code, input means for supplying signals of said first code to said converter, certain of the incoming signals of said first code being assigned to a first group and others of said signals being assigned to a second group, means in said converter for determining the group of each incoming signal including a set of trigger units having input and output circuits, said trigger units being connected to extend the elements of each incoming signal over their respective output paths, signal means for converting the incoming signals of the first group by adding a predetermined number of elements to the basic signal as received, and means including said signal means for converting signals of the second group by adding said predetermined number of elements thereto and by additionally altering predetermined ones of the elements of the basic signal, said last-mentioned means comprising a rectifier set for each signal of said second group, means for connecting the rectifiers of each group to provide a conversion signal only with application of its associated signal at the output side of the trigger units, and output means for each rectifier set connected to the input circuits of said trigger units for extending conversion signals thereto to control same to provide the desired element alterations, different ones of said rectifier sets being connected to different combinations of said trigger units.

17. In a signalling system wherein signals have been converted from a first and basic code into a second code by adding a prefix element to the elements of each basic signal of the first code and by additionally altering the elements of only predetermined ones of the basic signals, a code converter for converting the signals from said second code to said first code comprising a plurality of trigger sets, means for applying incoming signals of said second code thereto, output paths for each of said trigger sets, a rectifier set for each one of said predetermined ones of said signals, means for connecting each of said rectifier sets to the output paths of said trigger units and signal generator means connected to each rectifier set operative only when its corresponding signal is coupled over said output paths to its associated rectifier set, and circuit means for coupling the output signals of each rectifier circuit as energized to the input sides of said trigger sets to operate same to provide the corresponding basic signals in the output paths thereof.

18. In a signalling system for effecting the transmission of signals, a code converter for converting signals from one code to a second code comprising a plurality of trigger sets, means for applying the elements of the incoming signals of the first code to the respective ones of the trigger sets, a rectifier set for at least certain signals of said first code, means for connecting each of said rectifier sets to the output paths of said trigger units, circuit means connecting the elements of each of said rectifier sets to control each set to provide a signal output only when one signal preassigned thereto appears on said output paths, and coupling means for coupling the output signals of the rectifier sets to the input side of said trigger circuits, the elements of the rectifier output signals being different than the elements of the incoming signal, whereby a converted signal appears at the output side of said converter.

19. In a signalling system which includes converter means for converting signals from a first basic code into an intermediate code by initially adding a predetermined number of elements to each signal of said first code and by transforming the signals as thus modified which have less than $p-1$ marking elements and more than $p$ marking elements to a code signal having alternatively $p$ and $p-1$ marking elements; and parity conversion means for thereafter adding at least one element to each signal of a polarity to provide signals of a fixed ratio code having $p$ marking elements; receiver means, parity check means in said receiver means operative to check each signal for said fixed ratio code including pulse absorbing means operative to absorb the parity conversion elements added to each signal, to thereby provide signals in said intermediate code; and code converter means including signal input means, check means connected to said signal input means for detecting signals in the intermediate code which were transformed in the conversion from the first code to the intermediate code, including transformation means connected to said check means for retransforming said signals into said first basic code; and signal means in said signal input means operative to absorb the element which was added to the basic signal to translate the signal from said first code into said intermediate code.

References Cited in the file of this patent

UNITED STATES PATENTS

| 2,369,474 | Luhn | Feb. 13, 1945 |
| 2,603,705 | Van Duuren | July 15, 1952 |
| 2,653,996 | Wright | Sept. 29, 1953 |
| 2,674,727 | Spielberg | Apr. 6, 1954 |
| 2,713,084 | Berwin | July 12, 1955 |

FOREIGN PATENTS

| 637,451 | Great Britain | May 17, 1950 |